(12) United States Patent
Cerf

(10) Patent No.: US 9,533,781 B2
(45) Date of Patent: Jan. 3, 2017

(54) MULTIPLE SEALING BARS FOR FILM WRAPPING

(71) Applicant: Alain Cerf, Redding Beach, FL (US)

(72) Inventor: Alain Cerf, Redding Beach, FL (US)

( * ) Notice: Subject to any disclaimer, the term of this patent is extended or adjusted under 35 U.S.C. 154(b) by 457 days.

(21) Appl. No.: 14/246,814

(22) Filed: Apr. 7, 2014

(65) Prior Publication Data

US 2014/0298755 A1 Oct. 9, 2014

Related U.S. Application Data

(60) Provisional application No. 61/809,749, filed on Apr. 8, 2013.

(51) Int. Cl.
| | |
|---|---|
| *B65B 9/10* | (2006.01) |
| *B65B 51/30* | (2006.01) |
| *B65B 61/06* | (2006.01) |
| *B29C 65/74* | (2006.01) |
| *B29C 65/78* | (2006.01) |
| *B29C 65/00* | (2006.01) |
| *B29C 65/02* | (2006.01) |

(52) U.S. Cl.
CPC ............... *B65B 9/10* (2013.01); *B65B 51/303* (2013.01); *B29C 65/02* (2013.01); *B29C 65/74* (2013.01); *B29C 65/787* (2013.01); *B29C 65/7894* (2013.01); *B29C 66/1122* (2013.01); *B29C 66/343* (2013.01); *B29C 66/4312* (2013.01); *B29C 66/73715* (2013.01); *B29C 66/81465* (2013.01); *B29C 66/83543* (2013.01); *B29C 66/849* (2013.01); *B29C 66/8432* (2013.01); *B65B 61/06* (2013.01)

(58) Field of Classification Search
CPC ............ B65B 9/10; B65B 9/12; B65B 51/303; B65B 61/06; B29C 65/74; B29C 65/787; B29C 65/7894; B29C 65/1122; B29C 65/02; B29C 66/343; B29C 66/4312; B29C 66/73715; B29C 66/81465; B29C 66/83543; B29C 66/8432; B29C 66/849
See application file for complete search history.

(56) References Cited

U.S. PATENT DOCUMENTS

| | | | | |
|---|---|---|---|---|
| 4,034,536 A | * | 7/1977 | Mahaffy | B29C 51/22 53/427 |
| 4,110,954 A | * | 9/1978 | Olsson | B65B 9/02 53/433 |
| 4,947,605 A | * | 8/1990 | Ramsey | B65B 53/063 53/252 |
| 5,271,210 A | * | 12/1993 | Tolson | B65B 61/28 198/343.1 |
| 5,385,004 A | * | 1/1995 | Tolson | B65G 21/14 198/626.1 |
| 6,962,033 B2 | * | 11/2005 | Guzman | B29C 66/73715 53/373.5 |

(Continued)

*Primary Examiner* — Christopher Harmon
(74) *Attorney, Agent, or Firm* — Sam Silverberg

(57) ABSTRACT

This invention is directed to multiple sealing bars to seal articles moving on a conveyor (2) inside a sleeve (4) that forms a continuous film tube (5). Retracting conveyors act to collapse the tube between the articles so that the collapsed portion of the tube can be sealed. The synchronization of the sealing bars with the movement of retracting conveyors allows for a continuous motion machine where the products inside the film do not stop.

12 Claims, 6 Drawing Sheets

(56) References Cited

U.S. PATENT DOCUMENTS

| | | | |
|---|---|---|---|
| 8,590,279 B2* | 11/2013 | Van Den Elzen et al. | B65B 9/045 53/453 |
| 2007/0186512 A1* | 8/2007 | Rimondi | B65B 9/073 53/441 |
| 2010/0215813 A1* | 8/2010 | Peterson et al. | B65B 9/2007 426/106 |
| 2012/0297734 A1* | 11/2012 | Dinardo | B65B 9/06 53/450 |

* cited by examiner

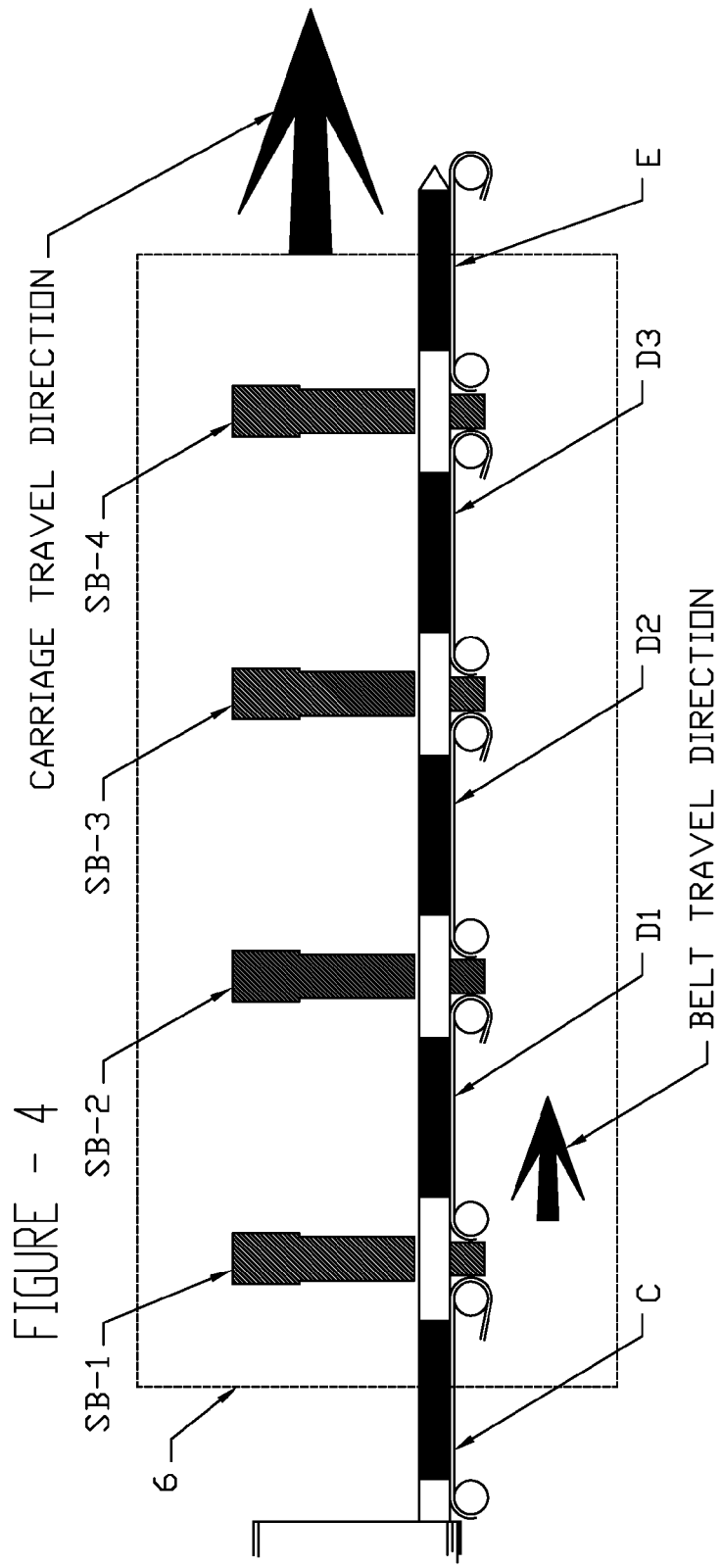

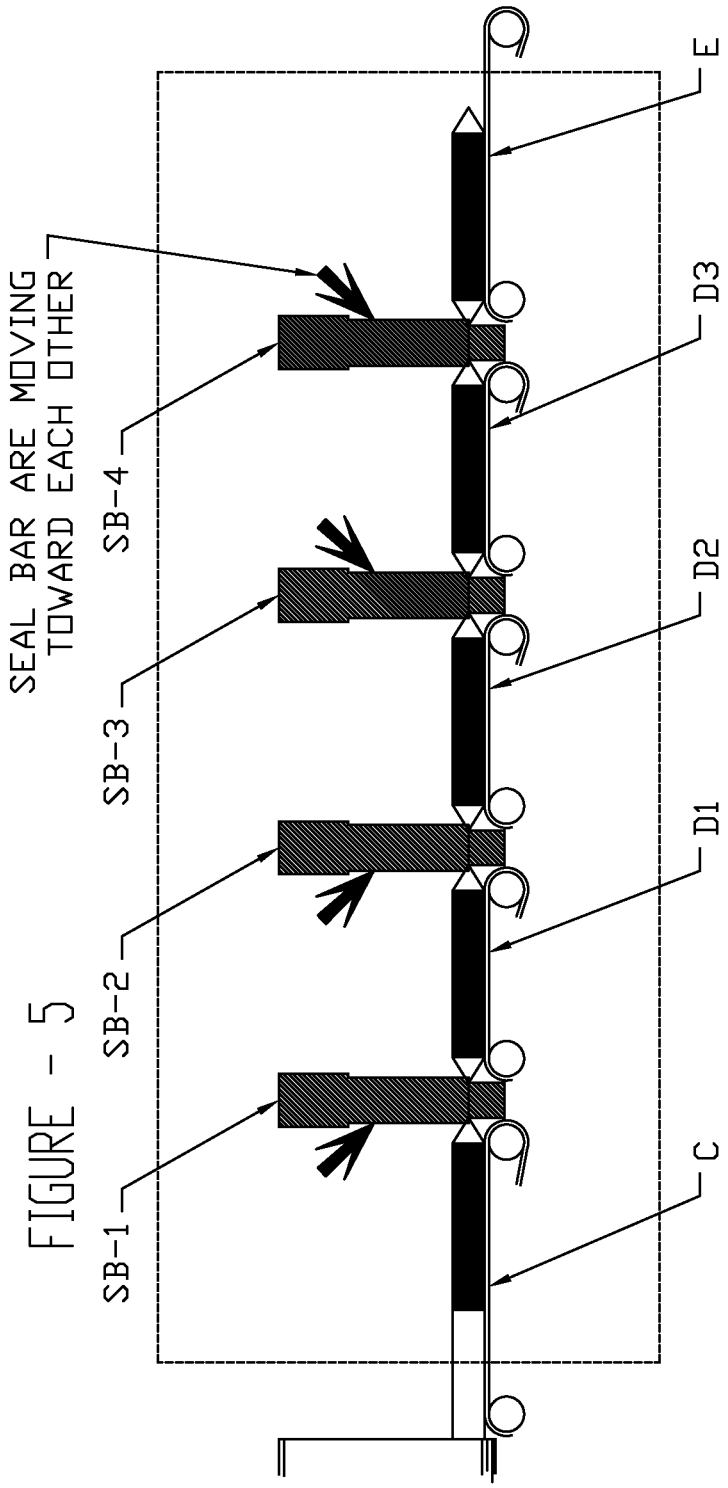

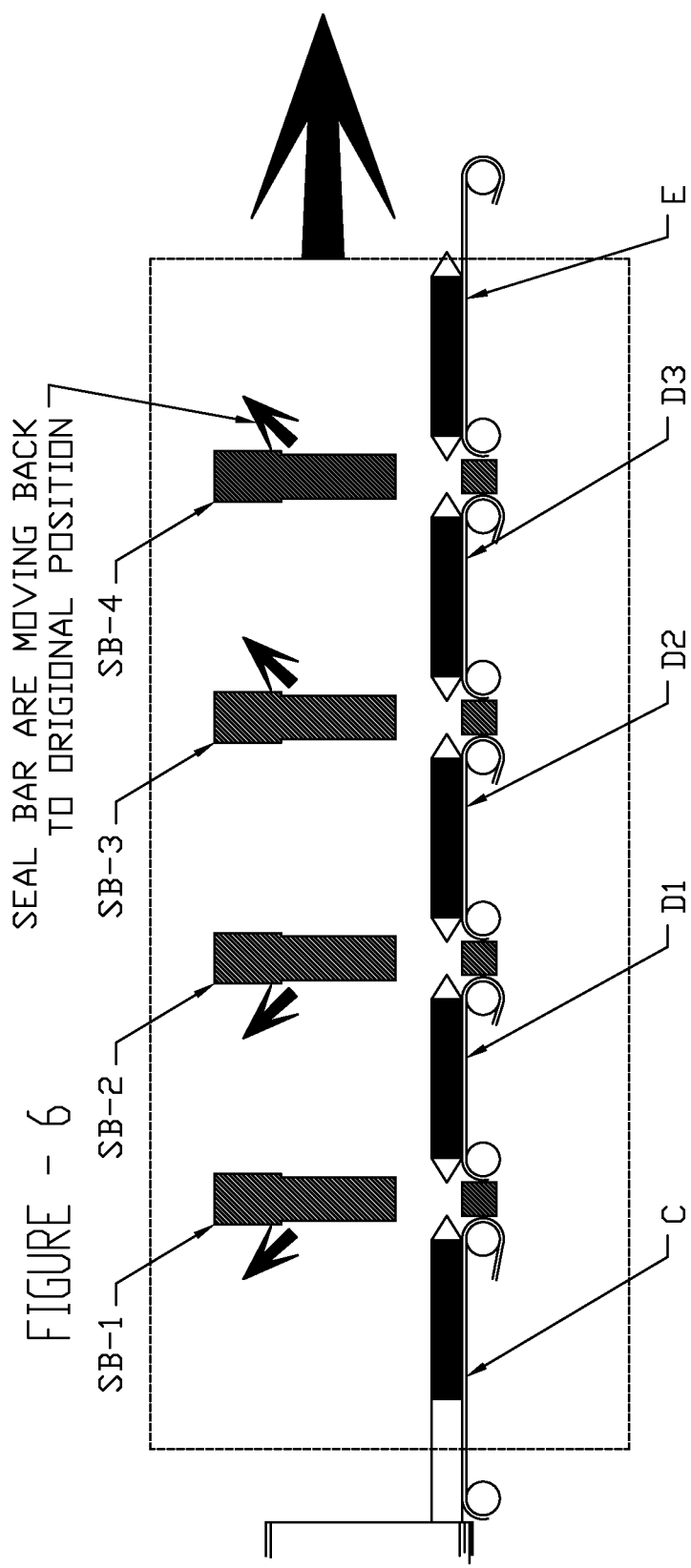

MULTIPLE SEALING BARS FOR FILM WRAPPING

FIELD OF THE INVENTION

This invention is related to using multiple sealing bars on a film wrapping machine. The film wrapping machine can include a heat tunnel that shrinks the film around an article.

BACKGROUND OF THE INVENTION

The use of a single sealing bar on film wrapping machine is well known in the art. In order to seal and separate the articles in the tube, a section of the tube between the articles needs to collapse so that the sealing bar can pinch and seal the collapsed tube while the articles are moving on a conveyor. During the sealing process the section of the collapsed tube is separated thereby forming an article inside a tube that is sealed at each end. To collapse the tube a conveyor needs to be slowed to increase the slack in the tube. This reduces the productivity of the machine.

BRIEF DESCRIPTION OF THE DRAWING

FIGS. 4-6 shows a detailed view how the sealing bars and the retractable conveyors operate.

DETAILED DESCRIPTION OF THE INVENTION

Figure 1:
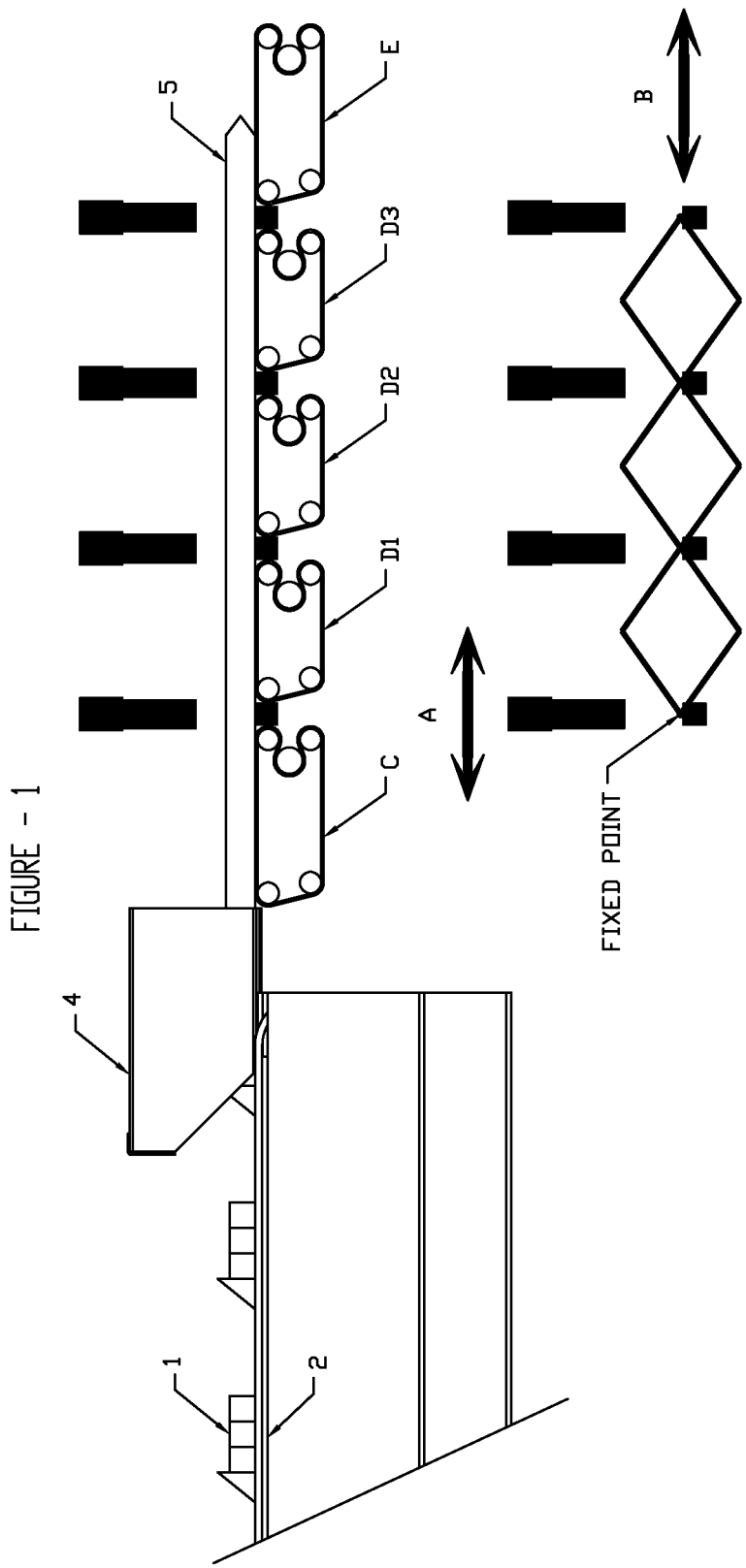
FIGS. 1-3 shows the using multiple sealing bars with retractable conveyors
Figure 2:
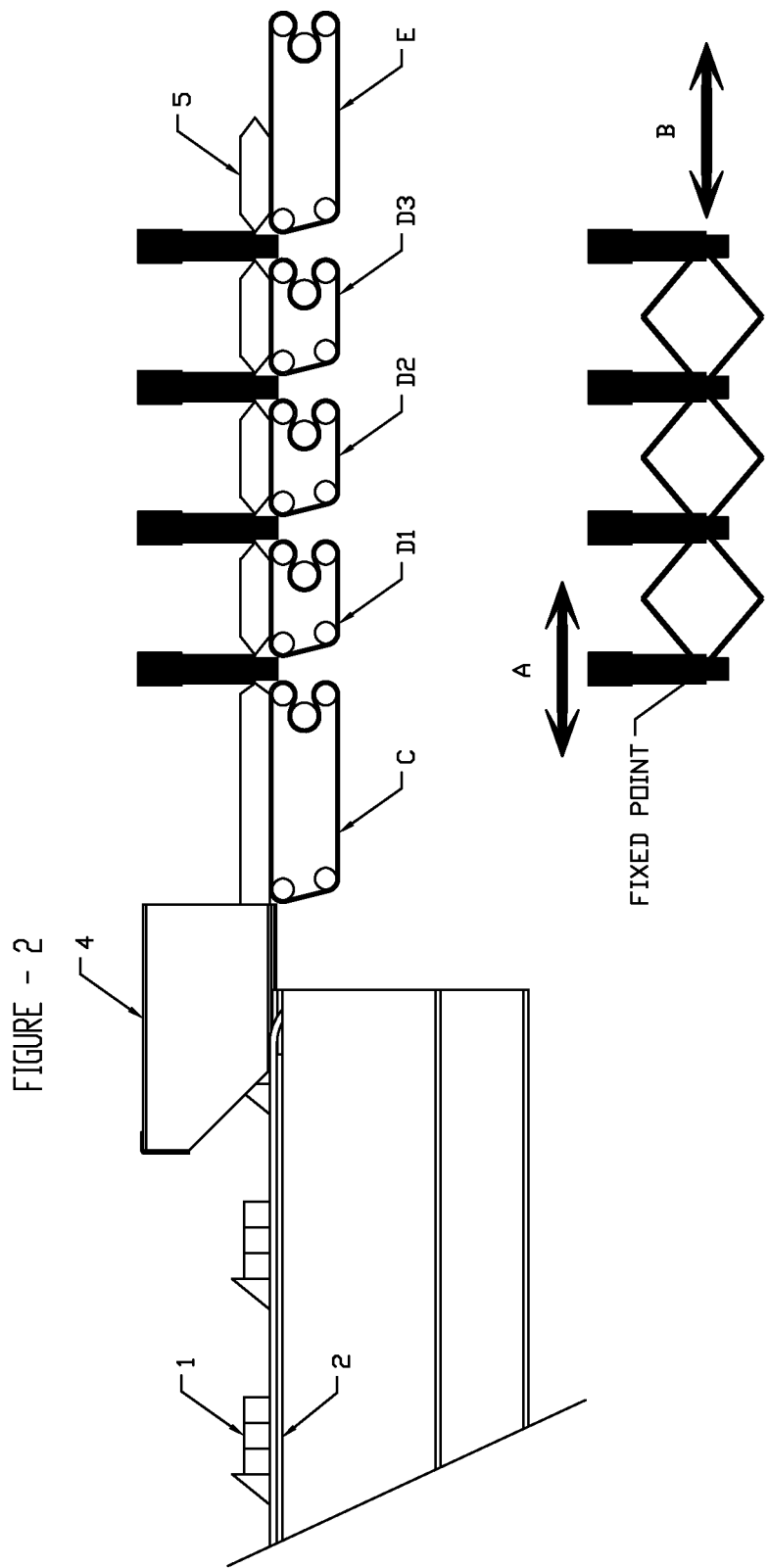
Figure 3:
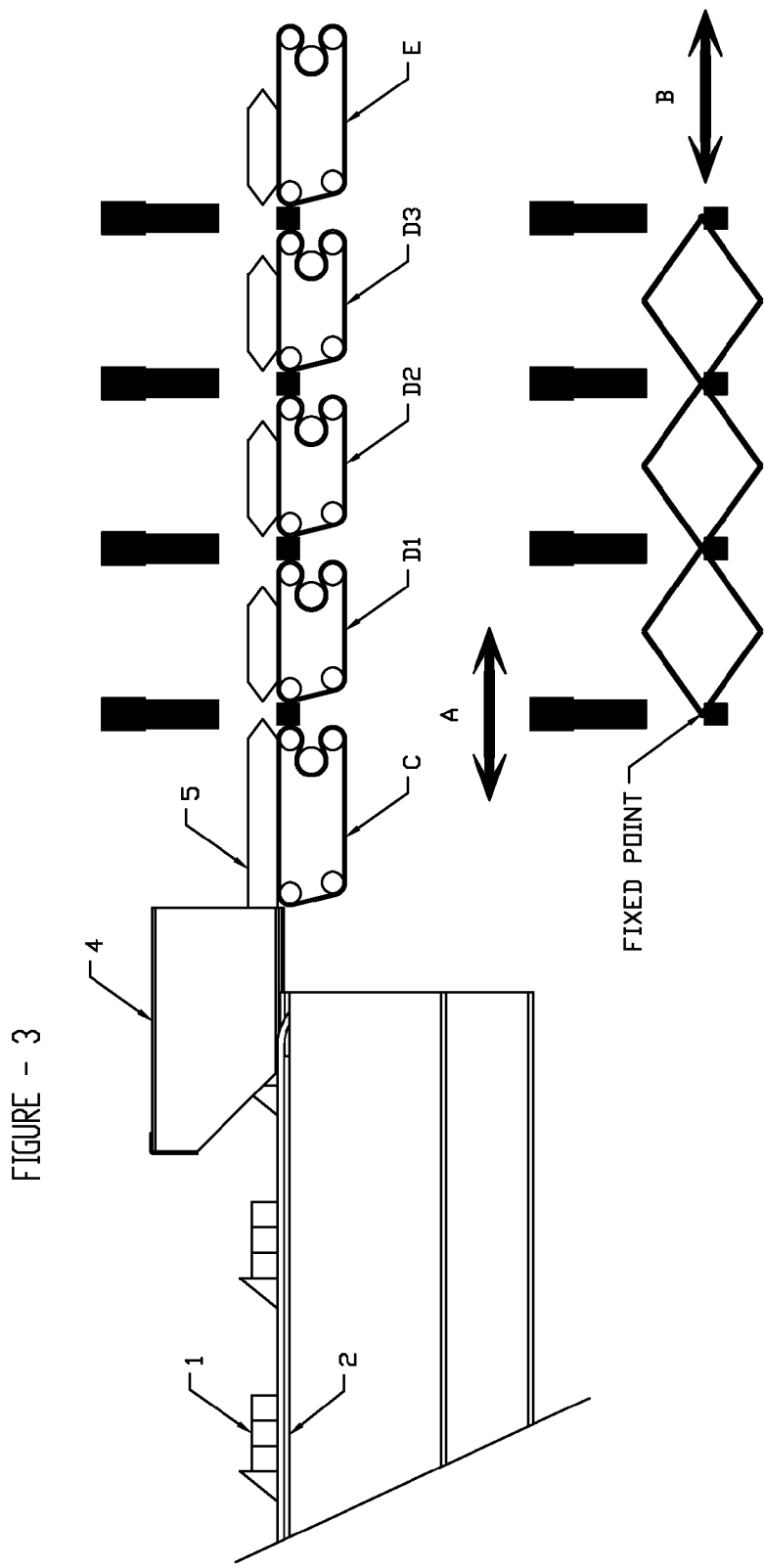

This invention addresses the need in the art for a faster machine. Faster productivity is accomplished by using multiple sealing bars. Multiple sealing bars have not been used in the prior art. FIGS. 1-3 shows multiple seal bars SB-1 to SB-4 an articles or bundles of articles 1 moving on a conveyor 2 inside a sleeve 4 that forms a continuous film tube 5. FIGS. 4, 5 and 6 show a detailed view of the movement of the sealing bars, retracting conveyors and the carriage as shown in FIGS. 1 and 2. FIG. 4 shows a continuous motion machine where the products inside the film do not stop. The machine and product is moving at a continuous speed S. The sealing bars SB-1, SB-2, SB-3 and S-B4 and the conveyors D1, D2 and D3 between the sealing bars are mounted on a carriage 6. When the first product passes SB4 shown as position E, the carriage starts moving at approximately or slightly less than the speed S. FIG. 5 shows collapsing the film tube by decreasing the tension on the film tube by contracting the length of each conveyor between the sealing bars D1, D2 and D3. The conveyors move at a speed approximately or slight less than the speed of the machine and products. The contracted length of each conveyor is approximately the same. While the length of the conveyor is contracted the sealing bars follow the same motion staying about equal distance between the ends of the shorter conveyor. While the conveyor between the sealing bars are contracting, conveyors C and E are expanding to insure that the gaps between conveyors C and D1 and D3 and E are at the desired spacing. The contraction of the conveyors is completed about the same time the sealing bars is closing on the film tube. When the sealing bar is closed the conveyors maintain their contracted length.

FIG. 5 shows sealing SB1 and SB2 following conveyor D1 in the machine direction. Like wise SB3 and SB4 follows the movement of conveyor D2 and D3 to position themselves equidistant between the shorter conveyers. When the sealing bars start to close and the conveyor lengths contract, conveyor C and E moves from the position shown in FIG. 4 to the position shown in FIG. 5. Likewise Conveyor E slows down when move in the closed. During the entire process conveyor C moves at approximately same speed S or slightly less. Conveyor E will slow down when the sealing bars close and will accelerate when sealing Bar SB4 opens. The sealing bar cuts the film tube and seals each end.

FIG. 6 shows that after sealing, the carriage with the sealing bars and the retracted conveyors move back to their original position. The speed of the sealing bars has to be sufficient to insure that they are located between the retracted conveyors.

The invention claimed is:

1. A process for using multiple sealing bars for sealing products in a tube moving on a conveyor comprising:
    placing articles on a conveyor
    transporting the articles into a film tube at a predetermined speed
    providing a carriage having multiple movable sealing bars spaced in the direction of movement of the articles and conveyors between the sealing bars wherein the length of the conveyors can contract and expand,
    sensing when an article in the tube passes the sealing bar located furthest down stream
    moving the carriage in machine direction at about or slightly less then the predetermined speed in response to the sensing,
    contracting the length of the conveyors between the sealing bar to collapse the film tube between articles while positioning the sealing bars over the collapsed film between the articles,
    sealing the collapsed film, and
    retracting the carriage to the original position while the sealing bars and the conveyors between the sealing bars return to their approximate starting position.

2. A process according to claim 1 wherein a retractable conveyor is located down stream of the last sealing bar will slow down when the sealing bar closes and will accelerate when the sealing bar opens.

3. A process according to claim 2 wherein there are 4 movable seal bars.

4. An apparatus for using multiple sealing bars for sealing articles in a film tube comprising,
    means for placing articles on a conveyor,
    means for transporting the articles into a film tube
    means for carrying movable sealing bars spaced in the direction of the of the movement of the articles and retractable conveyors between the sealing bars for moving the film tube,
    means for collapsing the film tube between the articles, and
    means for sealing and cutting the collapsed film.

5. An apparatus according to claim 4 wherein the means for carrying is a carriage that moves in the machine direction.

6. An apparatus according to claim 5 wherein the sealing bars and the retractable conveyors are mounted on the carriage.

7. An apparatus according to claim 5 wherein the means for collapsing includes means for retracting the conveyors between the sealing bars to collapse the tube film.

8. An apparatus according to claim 7 wherein the sealing bars move to a location between the retracted conveyors to cut and seal the tube film.

9. An apparatus according to claim 1 including a retractable conveyor before the first sealing bar and a retractable conveyor after the last sealing bar.

10. An apparatus according to claim 8 including means for moving the carriage forward when an article passes the sealing bar located furthest down stream.

11. An apparatus according to claim 10 including means for moving the carriage to about its original position after the tube film has been cut and sealed.

12. A process for using multiple sealing bars for sealing products in a tube moving on a conveyor comprising:

placing articles on a conveyor transporting the articles into a film tube at a predetermined speed providing a carriage having multiple movable sealing bars spaced in the direction of movement of the articles and conveyors between the sealing bars wherein the length of the conveyors can contract and expand, moving the carriage in machine direction at about or slightly less then the predetermined speed, contracting the length of the conveyors between the sealing bar to collapse the film tube, between articles while positioning the sealing bars over the collapsed film between the articles, sealing the collapsed film, and retracting the carriage to the original position while the sealing bars and the conveyors between the sealing bars return to their approximate starting position.

* * * * *